United States Patent [19]

Rudloff

[11] 3,975,483

[45] Aug. 17, 1976

[54] PROCESS FOR MANUFACTURING STRATIFIED MATERIALS

[76] Inventor: Bernard Rudloff, Marckolsheim (Bas-Rhin), France

[22] Filed: Nov. 6, 1970

[21] Appl. No.: 87,605

Related U.S. Application Data

[63] Continuation-in-part of Ser. No. 657,045, July 31, 1967, abandoned.

[30] Foreign Application Priority Data

Jan. 12, 1967 France .................................. 67.8792

[52] U.S. Cl. ................................ 264/137; 264/112; 264/134
[51] Int. Cl.² ............................................. B29B 3/00
[58] Field of Search ........... 264/134, 136, 137, 112, 264/120, 236, 131

[56] References Cited
UNITED STATES PATENTS

| | | | |
|---|---|---|---|
| 3,230,287 | 1/1966 | Caron ................................. | 264/120 |
| 3,269,977 | 8/1966 | Andres............................... | 264/137 |
| 3,309,444 | 3/1967 | Schueller ........................... | 264/109 |
| 3,356,781 | 12/1967 | Sulewski ......................... | 264/324 X |
| 3,361,845 | 1/1968 | Watanabe........................ | 264/137 X |

FOREIGN PATENTS OR APPLICATIONS 456,355   1949   Canada ............................... 264/137

OTHER PUBLICATIONS

Frank, Def. Pub. of Serial No. 817,546, Def. Pub. T869,009.

Primary Examiner—Richard R. Kucia
Attorney, Agent, or Firm—Ernest G. Montague; Karl F. Ross; Herbert Dubno

[57] ABSTRACT

The present invention provides novel rigid and flexible stratified shaped fiber-reinforced plastic aticles. These are produced by impregnating a layer of fibers with at least two different resins in powder form, the first of said resins being characterized by hardening at 60° C – 100° C, and the second of said resins hardening at a temperature of 110°C – 200°C at elevated pressure to form a resin impregnated fiber sheet. This sheet is first heated at the lower temperature, and then cut to form shaped sections which are positioned in a mold and heated to the higher temperature with the application of pressure to form the stratified shaped fiber-reinforced plastic article.

11 Claims, No Drawings

PROCESS FOR MANUFACTURING STRATIFIED MATERIALS

This application is a continuation-in-part application of Ser. No. 657,045 filed July 31st, 1967 (now abandoned).

BACKGROUND OF THE INVENTION

This invention relates to stratified materials (articles) and the process for manufacturing them in which felts or layers of fibers impregnated with resin powders are caused to polymerize and/or otherwise harden and thereby to bond the fibers and form a coherent article.

It is known that according to a process developed by the inventor of the present invention, it is possible to impregnate a loose felt or other layer of fibers uniformly with synthetic resin powders. The synthetic resin powders are finely subdivided and coat the fibers and adhere thereto. The loose felt or layer can be compressed by rolling to form a sheet. The sheet formed as a consequence of the rolling operation can be obtained in different thicknesses and with different weights per square meter. This sheet may then be heated by passage on a pair of foraminous conveyor belts through a tunnel wherein polymerization occurs as a consequence of the heating. The conveyor belts maintain the sheet under a slight pressure at the desired uniform thickness. Hot air is passed through the sheet, heating the sheet and causing polymerization of the resin and thereby bonding the fibers to one another. The sheet is thus transformed into a firm felt, the flexibility and elasticity of which can be regulated at will as a function of the quantity of the resins charged to the fibers. This process is disclosed in Pat. No. 3,200,181 issued Aug. 10, 1965.

It is also known that several types of resins having different melting points can be incorporated in the same manner in the sheets of fibers, and in general it is possible to incorporate any product or desired substance in very finely ground powder form, such for example as fire-proofing substances or materials, mineral ores, or asbestos or stone dusts.

SUMMARY OF THE INVENTION

The present invention provides both rigid and flexible stratified shaped fiber-reinforced plastic articles. These are produced by impregnating a layer of fibers with at least two different resins in powder form, the first of said resins being characterized by hardening as a result of being heated to a temperature between about 60°C and 100°C, and the second of said resins being characterized by hardening as a result of being heated to a temperature between about 110°C and 200°C at a pressure between about 400 and 600 kg. per sq. cm., to form a resin impregnated fiber sheet; heating said resin impregnated fiber sheet at a temperature between about 60°C and 100°C sufficient to harden said first resin powder thereby strengthening said resin impregnated fiber sheet sufficient so that it may be cut and handled without disintegration thereof; cutting the strengthening resin impregnated fiber sheet to form shaped sections of resin impregnated fiber sheet; positioning at least one of said shaped sections of resin immpregnated fiber sheets in a mold and heating to a temperature between about 110°C and 200°C and applying a pressure of between about 400 and 600 kg. per sq. cm., to form a stratified shaped fiber-reinforced plastic article; and cooling said stratified shaped fiber-reinforced plastic article.

DESCRIPTION OF THE PREFERRED EMBODIMENTS

The fibers utilized for reinforcement may be of any kind and of any origin. This includes the wide variety of synthetic fibers, naturally occurring fibers, shredded waste, etc. Cotton fibers are particularly preferred.

Any resin powder having the characteristics specified i.e. the ability to harden as a result of being heated to a temperature of 60°–100°C or 110°–200°C at elevated pressure may be used in this process. The resin powders particularly preferred of those that harden as a result of being heated to the lower temperature are rosin (colophony), esterified rosins, and coumarone. The higher melting point or polymerization point resin powders may be either of the thermosetting type or the thermoplastic type. The thermosetting type cross link when heated to temperatures of between 140°C and 200°C at the pressure specified. The peferred thermosetting resin powders are the phenolic resins, e.g. phenol formaldehyde resins, and the urea formaldehyde resins. The useful thermoplastic resins are those which will fuse at a temperature between about 110°C and 140°C at the high pressures specified. The preferred thermoplastic resins are the polyvinyl chloride resins (homopolymers and copolymers) and the various natural and artifical rubbers e.g. the natural latex product, elastomeric styrene-butadiene etc. The flexible thermoplastic resins such as plasticized polyvinyl chloride and the various elastomer (rubbery) polymers are particularly useful when manufacturing a flexible stratified shaped fiber-reinforced plastic article according to the present invention.

The operations of impregnating a layer of fibers with the powdered resins and then heating to a temperature between 60°C and 80°C to harden the lower temperature resin and provide strength and coherency to the resin impregnated layer of fibers is preferably carried out as disclosed in U.S. Pat. No. 3,200,181, with the modification that the heating operation at a temperature of between 60°C and 100°C is lower than the temperatures disclosed in said patent. The fiber sheets which have been pre-polymerized (or partially polymerized) as aforesaid are cut to form shaped sections, with the size and shape determined with regard to the finished articles desired. These shaped sections are then placed in a mold, preferably a two-part mold which may be heated by such means as electric resistors imbedded therein or by a heated fluid circuit. Pressure is preferably obtained by compressing the mold between the plates of a hydraulic press. The fiber sheet or portion thereof which is referred to herein as "shaped sections" is placed in the mold. The shaped section need not necessarily conform to the desired shape of the final product.

The invention is illustrated by the preparation of a fiber sheet impregnated with esterified rosins (colophonies) having a melting point of 60°C which permit obtaining a sufficiently strengthened resin impregnated fiber sheet with sufficient stability, with a first polymerization at the low temperature, for example 60°C. The higher melting point resin powder utilized is a thermosetting phenol resin.

It is of course also possible to incorporate coloring agents in powder form in the resins, or to utilize colored resins, to produce colored stratified articles. It is also possible by addition to the powders and simultaneously with impregnating the powders to incorporate fire proofing agents, fungicides, germicides, and other suitable substances or agents with the purpose of imparting more precise properties to the final stratified articles (materials) according to the uses for which they are intended.

An advantage of the process of the present invention including the concept of obtaining the novel stratified materials consists in the facility of obtaining objects of shapes having very accentuated reliefs or very pronounced cavities, as a result of the great flexibility of the basic fiber sheet impregnated with the resin powders, which permits the mass to follow all the curves of the molds without being torn or crumpled. Moreover, the molds may be readily designed like those which are utilized for stamping or cold forming.

The novel stratified articles of the present invention may be subjected to all conventional machining operations. They may be bonded in the hot or cold state and onto any desired support. It is also possible to add any lining, for example paper, cloth, metallic lining or other lining, by placing the lining sheet in the mold with the purpose of imparting its appearance to the final appearance of the object or material produced by the process.

The stratified materials and objects manufactured in accordance with the present process may be surface treated in a subsequent operation, as are other stratified materials in general, for example by means of coatings of paint, lacquer, PVC coatings, glues, adhesives and all other suitable substances or treatments.

The many uses of the stratified articles (materials) are illustrated by use in varied industries such as for example manufacture of furniture, in carpentry, toys, packages, automobile construction, insulation for electrical apparatus, household appliances, and small mechanical elements. The flexible stratified article such as floor carpets or conveyor belts may be produced by using the thermoplastic resin powders which produce flexible articles after molding such as flexible PVC or the rubber polymers (including latex in powder form), in place of the thermosetting resins illustrated hereinbefore. The process also provides a method for corrugating one or both of the surfaces of the article.

The invention is further illustrated in the following example

A fiber sheet was impregnated with 7% by weight relative to the weight of the fibers of esterified rosin and with 23% by weight relative to the weight of the fibers with a phenolic "Novolak" (phenolformaldehyde with 6% hexamethylene tetramine). A strengthened fiber sheet was prepared following the process disclosed in Pat. No. 3,200,181, except that the heat was applied at a temperature of 70°C. The partially polymerized (prepolymerized) sheet was cut into tablets having a diameter of 500 mm. These tablets were placed into molds (two sectional) on a hydraulic press and heated to a temperature of 180°C with an applied average pressure of 400 kg. per square cm for two minutes. The temperature and pressure are applied simultaneously. The mold is then opened revealing the finished article which is then allowed to cool in ambient air. The product was a rigid stratified cylindrical fiber-reinforced plastic article having a brilliant aspect.

As a result of the simultaneous application of pressure and temperature, the phenolic resins fuse and flow out toward the exterior. The fibers are completely encased and not visible on the surface. Thus one obtains a stratified product reinforced with fibers on the interior. The outer surface preferably does not contain the reinforcing fibers.

The finished article may be cooled in ambient air as illustrated or may be cooled by means of any appropriate continuous or discontinuous ventilation system.

An advantage of the process is its great economy. It permits the manufacture of articles in which the percentage by weight of the resins in relation to the total weight of the stratified finished article is low for example about 20%, whereas the fiber reinforced sheet materials produced heretofore are composed of 80 to 90% resins. The process of the present invention also permits the manufacture of products of very great uniformity.

I claim:
1. The process for the manufacture of rigid and flexible stratified shaped fiber-reinforced plastic articles comprising
   impregnating a layer of fibers with at least two different resins in powder form, the first of said resins being characterized by hardening as a result of being heated to a temperature between about 60°C and 100°C, and the second of said resins being characterized by hardening as a result of being heated to a temperature between about 110°C and 200°C at a pressure between about 400 and 600 kg. per sq. cm., to form a resin impregnated fiber sheet;
   heating said resin impregnated fiber sheet at a temperature between about 60°C and 100 °C sufficient to harden said first resin powder thereby strengthening said resin impregnated fiber sheet sufficient so that it may be cut and handled without disintegration thereof;
   cutting the strengthening resin impregnated fiber sheet to form shaped sections of resin impregnated fiber sheet;
   positioning at least one of said shaped sections of resin impregnated fiber sheets in a mold and heating to a temperature between about 110°C and 200°C and applying a pressure of between about 400 and 600 kg. per sq. cm., to form a stratified shaped fiber-reinforced plastic article; and
   cooling said stratified shaped fiber-reinforced plastic article.

2. The process of claim 1 wherein at least two of said shaped sections of resin impregnated fiber sheet are positioned in said mold; wherein said second resin is a resin selected from the group consisting of a thermoplastic resin and a thermosetting resin; and wherein when said resin is a thermoplastic resin it is heated to a temperature between about 110°C and 140°C and when it is a thermosetting resin it is heated to a temperature of between about 140°C and 200°C, respectively.

3. The process of claim 2 wherein said second resin is at least one thermosetting resin selected from the group consisting of phenolic resins and urea formaldehyde resins.

4. The process of claim 2 wherein said second resin is at least one thermoplastic resin selected from the group consisting of polyvinyl chloride resins and rubbery polymers.

5. The process of claim 2 wherein said first resin is at least one resin selected from the group consisting of rosin, esterified rosin, and coumarone.

6. The process of claim 5 wherein said fiber is a cotton fiber.

7. The process for the manufacture of stratified shaped fiber-reinforced plastic articles comprising
impregnating a layer of fibers with at least two different resins in powder form, the first of said resins being characterized by hardening as a result of being heated to a temperature between about 60°C and 100°C, and the second of said resins being as the thermosetting resin which hardens as a result of being heated to a temperature between about 140°C and 200°C at a pressure between about 400 and 600 kg. per sq. cm., to form a resin impregnated fiber sheet;
heating said resin impregnated fiber sheet at a temperature between about 60°C and 100°C sufficient to harden said first resin powder thereby strengthening said resin impregnated fiber sheet sufficient so that it may be cut and handled without disintegration thereof;
cutting the strengthening resin impregnated fiber sheet to form shaped sections of resin impregnated fiber sheet;
positioning at least one of said shaped sections of resin impregnated fiber sheets in a mold and heating to a temperature between about 140°C and 200°C and applying a pressure of between about 400 and 600 kg. per sq. cm., to form a stratified shaped fiber-reinforced plastic article; and
cooling said stratified shaped fiber-reinforced plastic article.

8. The process of claim 7 wherein said first resin is at least one resin selected from the group consisting of rosin, esterified rosin and coumarone, and wherein first resin is heated to a temperature between about 60°C and 80°C.

9. The process of claim 8 wherein said thermosetting resin is selected from the group consisting of phenolic resins and urea formaldehyde resins.

10. The process of claim 9 wherein said first resin is an esterified rosin and wherein said second resin is a phenol-formaldehyde resin.

11. The process of claim 10 wherein said first resin is in an amount of about 7% by weight of the total weight of the impregnated layer of fibers; wherein said second resin is in an amount of about 23% by weight of the total weight of the impregnated layer of fibers; and wherein said second resin is a phenol-formaldehyde containing hexamethylene tetraamine.

* * * * *